Feb. 20, 1968 R. C. HARVEY 3,369,903
LIGHT SENSITIVE ELEMENT FOR PREPARING ETCHING RESIST FOR GRAVURE PURPOSES
Filed Dec. 21, 1964
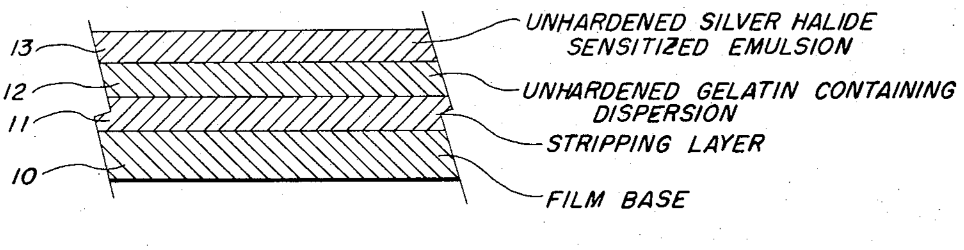
ROBERT C. HARVEY
INVENTOR.
BY R. Frank Smith
Henry E. Byers
ATTORNEYS United States Patent Office 3,369,903
Patented Feb. 20, 1968

3,369,903

LIGHT SENSITIVE ELEMENT FOR PREPARING ETCHING RESIST FOR GRAVURE PURPOSES

Robert C. Harvey, Rochester, N.Y., assignor to Eastman Kodak Company, Rochester, N.Y., a corporation of New Jersey Filed Dec. 21, 1964, Ser. No. 420,020
20 Claims. (Cl. 96—83)

This invention relates to a light sensitive element adapted for preparing the etching resist for photogravure platemaking purposes, which element is supplied with a dimensionally stable, temporary support from which it can be separated readily.

In the preparation of the etching resist in the photogravure process, so-called "carbon tissue" has been employed for many years. This material consists of a paper support coated with a pigment-gelatin layer which is sensitized to ultraviolet radiation and blue light by use of a bichromate solution. The carbon tissue has several serious shortcomings. It requires an intense light source for exposure; it has poor stability because of the propensity of the bichromate sensitizer to harden the gel layer gradually on keeping; it has poor dimensional stability; it is very fragile and it does not adapt itself readily to sensitometric measurements and control.

Light sensitive elements have been proposed which are adapted to improve on carbon tissue for the preparation of etching resists for photogravure platemaking. These elements have included the use of a cellulose ester film base, a stripping layer and a protective layer adjacent to the layer containing the sensitized gelatin coating. The protective layer remains temporarily adherent to the upper surface of the gelatin relief formed by processing the sensitized gelatin coating. After the gelatin relief is applied to a metal surface to form a resist for subsequent etching, it is necessary to remove the protective layer prior to the etching operation.

It has been found, however, that during development the oxidized developer tends to wander from the emulsion layer into the gelatin underlayer where it tans the gelatin making it more difficult to remove and in some instances require physical force which tends to damage the gelatin resist image in the emulsion layer.

I have found that the addition of an oil dispersion to the gelatin underlayer reduces the tendency of this layer to tan from the oxidized developer. Thus, the addition of an oil dispersion markedly improves the removal or washing-off of the gelatin underlayer. I have also found that the oil dispersion makes the wet gelatin layer white or opalescent, so that it it quite visible and can easily be seen. Thus, the improved visibility of this layer allows the operator to readily determine when all of the almost invisible, thin support or stripping layer has been removed and the underlying gelatin layer has been washed away leaving only the unhardened gelatin resist.

One object of this invention is to provide a light sensitive element for use in photogravure processes, the use of which facilitates the removal of the protective layer covering the etching resist. Another object is to provide, for use in photogravure processes, an element having a protective layer which becomes white or opalescent to aid the operator in determining when the stripping layer and the protective layer have been removed from the hardened gelatin resist. A further object is to provide a light sensitive element for use in photogravure processes which can be readily stripped from its base, can be transferred to the copper surface and treated with warm water to remove the protective layer and the stripping layer. Other objects will be apparent from the following specification.

The light sensitive elements of this invention may be carried by a conventional film base such as cellulose acetate, cellulose acetate butyrate, polystyrene or the like having a thickness substantially on the order of 0.005 to 0.015 inch. However, in my preferred embodiment. a dimensionally stable material such as a polyester, polyamide, glass, aluminum or the like is used.

The support may be provided with a subbing layer depending upon the particular base utilized. For instance, with a cellulose ester film base, the subbing layer may be cellulose nitrate having a thickness on the order of 0.002 inch, with a polyester support the subbing may be one of those found to be particularly effective with polyesters whereas with some supports such as the polyolefins, the surface may be electron bombarded or similarly treated such as by an oxidizing means prior to applying a subbing.

The stripping layer, applied on the support, may be a mixture of polyethylacrylate-acrylonitrile hydrosol containing surfactant and gelatin. A useful polymer of the hydrosol is made up of the product resulting from polymerizing a mixture of 60–90% ethylacrylate and acrylonitrile. The composition of the stripping layer can vary in the ratio of hydrosol to gelatin between 90:10 and 85:15 based on solids weight, preferably being approximately 87:13. The dry coverage of this layer can be from 0.1 to 1.0 gram of solids per square foot with the preferred range at 0.3 to 0.4 gram per square foot. This composition also contains a surfactant present as the result of the emulsion polymerization used in preparing the hydrosol. Other stripping layers may be used which are known in the art. For instance, when a polyester support is used, a cellulose nitrate sub is particularly suitable, wherein the coating composition contains a softening agent for the polyester such as resorcinol or the like. Other alcohol soluble softening agents may be used such as trichloracetic acid, orcinol, chlorohydrate, chlorinated benzenes, etc. However, in a preferred embodiment, unsubbed polyester support is used on which is coated a cellulose nitrate stripping layer which has a useful thickness of 0.3 to 0.025 mil.

Over the stripping layer is deposited an unhardened gelatin layer containing a dispersion of a crystalloidal solvent such as that described in Jelley and Vittum U.S. Patent 2,322,027, issued June 15, 1943. Any of the crystalloidal materials disclosed in the patent herein incorporated by reference are useful in preparing the gelatin underlayer of this invention. However, in my preferred embodiment, tri-o-cresyl phosphate is employed. It is also particularly useful to employ a gelatin coverage of 400 mg. to 700 mg. of gelatin per square foot whereas the crystalloidal solvent material is usefully employed at a coverage of 200 mg. to 800 mg. per square foot. Of course, other levels of gelatin and crystalloidal solvent could be utilized depending upon the results desired.

The light sensitive silver halide gelatin emulsion is applied over the antihalation or protective layer, the gelatin of these layers being unhardened. The emulsion layer should have a melting point less than 120° F. when immersed in water. By "substantially unhardened" as used and in the appended claims, it is understood that this means a hardness of the order obtained with gelatin having a melting point of less than 120° F. when immersed in water.

The light sensitive silver halide may be any of those useful in making silver halide emulsions. However, silver chlorobromide has been found to be quite suitable for this purpose. Various other silver salts may be used such as silver bromide, silver iodide, silver chloride or mixed silver halides such as silver chlorobromide. In the silver halide emulsion layer, a particularly suitable coverage of silver is 200 mg. of silver to 350 mg. of silver per square foot whereas the gelatin coverage is preferably within the range of 800 mg. to 1400 mg. of gelatin per square foot.

The exposed silver halide emulsion may be hardened in the image areas by a hardening or tanning type developer which is either incorporated in the emulsion or supplied from a developer solution, in the event that a tanning developing agent is not incorporated in the silver halide emulsion. A useful material is a polyhydroxy benzene developing agent such as catechol or hydroquinone. If the incorporated developer is insoluble it can be dispersed in an oil like material having a boiling point above about 175° C. such as one of those disclosed in the Jelley et al. U.S. Patent 2,322,027. Bridged dihydro and tetrahydro 1,4-dihydroxynaphthalene compounds which also have been found to be effective incorporated tanning developers include those having the following general formula:

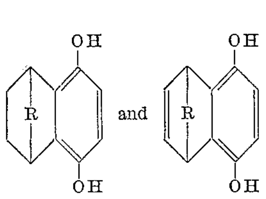

where R=$CH_2$, $CH_2CH_2$, O, S, etc.

The compounds may have various substituents in the alkylene ring.

Compounds of this type have been described by O. Diels and K. Alder, Bericht, 62, 2337 (1929) and by Porter et al., Journal of Organic Chemistry, 29, 588 (1964).

Upon immersing the exposed emulsion containing a tanning developer in an alkaline bath, the developer becomes activated and the light sensitive element becomes hardened in the image areas. Other tanning developers which may be used include chlorohydroquinone, gentisic acid and the like. After exposure, the silver halide emulsion is developed, fixed and washed as is known in the art and thereafter contacted to a copper surface after which the base or support layer is stripped away leaving the emulsion, the opalescent protective layer and the stripping layer on the copper surface. The application of warm water with rubbing action, if desired, completely removes the stripping layer, protective layer and the unhardened areas of the light sensitive element to leave a resist image on the surface of the metal support.

It will be appreciated that whereas the utility of this invention is described in terms of contacting against a copper metal plate which can be subsequently etched, other metal supports including zinc, etc., are also within the scope of this invention.

The following examples are intended to illustrate my invention but not to limit it in any way:

EXAMPLE 1

A light sensitive element for preparing an etching resist for gravure purposes was prepared having the following structure:

Unhardened silver chlorobromide gelatin emulsion (silver coverage 260 mg. silver per square foot) (gelatin coverage 1130 mg. gelatin per square foot) 3,6-dihydroxybenzonorbornane 110 mg. per square foot Unhardened gelatin 570 mg. per square foot and tartrazine plus a dispersion of tri-o-cresyl phosphate (500 mg. per square foot)

Cellulose nitrate stripping layer having a thickness of about 0.10 mil.

Temporary support—polyester

After exposure of the above element, the silver halide emulsion is processed in the following solutions:

*Solution A*

| Activator: | G. |
|---|---|
| $Na_2CO_3 \cdot H_2O$ | 75 |
| NaOH | 58 |
| KBr | 28 |

dissolved in one liter of water and used at room temperature, activation time thirty seconds to one minute.

*Solution B*

Tanning inhibitor: 50 g. $Na_2SO_3$.

dissolved in one liter of water, used at room temperature, treatment time—thirty seconds.

*Solution C*

| Acidifying solution: | G. |
|---|---|
| Citric acid | 50 |
| NaCl | 50 |

dissolved in one liter of water, used at room temperature, treatment time—30 seconds.

The processed material is washed in tap water, under 80° F. until free of salts (5–10 minutes) and dried.

The emulsion is contacted against the wet metal surface after which the support strips away easily. The stripping layer and the gelatin underlayer are easily removed with warm water. As the gelatin protective layer becomes soft from the heat, the stripping layer can be peeled away. The gelatin underlayer has a white opalescence which facilitates determining when all the unhardened areas are removed.

EXAMPLE 2

A similar coating was prepared as in Example 1 in which the oil dispersion was omitted from the gelatin underlayer. After processing, the thin support or stripping layer and the gelatin underlayer were difficult to remove. Also the gelatin underlayer was practically invisible and it was difficult to detect when it had been completely removed.

EXAMPLE 3

A series of coatings were made similar to coatings in Example 1 except that the amount of oil dispersions per square foot was varied as listed below with the indicated results:

| Coating No. | Mg. Oil Dispersion/ft.² | Stripping Characteristics |
|---|---|---|
| 1 | None | Poor |
| 2 | 500 | Good |
| 3 | 300 | Good |
| 4 | 100 | Poor |

All gelatin dispersions useful in this invention are prepared by adding the oil to a gelatin solution and passing the mixture through a Gaulin colloid mill as described in Jelley et al., U.S. Patent 2,322,027 to produce very fine dispersed particles. Although gelatin is given as the preferred colloid which can be tanned, it will be appreciated that there are other colloids, e.g., polyvinyl alcohol, etc., which are equally operative which are subject to tanning using a tanning-type silver halide developer. These colloids and other colloid materials of gelatin with various addenda are included within the scope of this invention provided the colloid binder can be tanned imagewise.

The element of my invention may be used in any of several gravure processes. For example, the element in accordance with the invention may be subjected to short exposure while in effective contact with an image or any other type of element, such as the image modulated light beam from a photoelectric scanning device, which will impart a latent image to the silver halide emulsion, as is well known in the photographic art. After exposure, the element, the emulsion of which has been exposed, is developed, fixed, washed and dried, which procedure differentially affects the gelatin of the emulsion layer imparting a hardening and insolubilizing effect to the gelatin around the silver grains of the image.

Where the element of my invention does not contain an incorporated tanning developer agent, a satisfactory method for processing the element is by a series of steps as follows:

(1) The element is bathed at 68° F. for 2 minutes in a developing solution consisting of:

| | Grams |
|---|---|
| Elon | 1.0 |
| Hydroquinone | 2.0 |
| Pyrogallic acid | 6.0 |
| Sodium sulfite | 9.0 |
| Potassium bromide | 1.5 |
| Sodium sulfate | 75.0 |
| Potassium metabisulfite | 5.0 |
| Water to make 1.0 liter. | |

(2) The liquid is drained off for 15 seconds.

(3) The element is developed at 68° F. for 2 minutes in an alkaline solution consisting of:

| | | |
|---|---|---|
| Trisodium phosphate | grams | 100.0 |
| Sodium sulfate | do | 75.0 |
| Phosphoric acid (85%) | cc | 5.0 |
| Water to make 1.0 liter. | | |

(4) The liquid is drained off for 15 seconds and rinsed for 60 seconds at 68° F. in a bath consisting of sodium diacetate—100 grams, water to make—one liter.

(5) Fixing is carried out for 5 minutes at 68° F. in a bath of the following composition:

| | | |
|---|---|---|
| Sodium thiosulfate | grams | 240.0 |
| Sodium sulfite (desiccated) | do | 10.0 |
| Sodium bisulfite | do | 25.0 |
| Glacial acetic acid | cc | 20.0 |
| Water to make 1.0 liter. | | |

(6) Wash in running water for 5 to 10 minutes.

(7) Immerse in the following solution for 60 seconds at room temperature:

| | | |
|---|---|---|
| Photo-Flo (wetting agent) | cc | 10.0 |
| Semicarbazide hydrochloride | gram | 1.0 |
| Ammonium hydroxide (28%) | cc | 10.0 |
| Water to make 1.0 liter. | | |

(8) Excess liquid is removed and the film is dried at either room temperature or elevated temperature.

After the element has been processed as described above, the base is conveniently stripped off and the unhardened gel removed by a wash-off procedure as follows:

(1) The processed gravure resist film is rolled, emulsion side down, onto the wetted surface of a copper gravure cylinder or plate.

(2) The cylinder or plate is sprayed with running water for 1 to 3 minutes at 40° to 60° F.

(3) The film base support is gently peeled therefrom leaving the emulsion adhering to the gravure cylinder or plate and is washed with water at 100 to 120° F. for 3 to 5 minutes. There remains a differentially hardened gelatin and silver image of varying degrees of thickness on the cylinder.

(4) The cylinder is flooded with a mixture of water and alcohol (80% alcohol).

With the copper cylinder containing the relief image the etched surface is formed in the following manner: some sort of protection such as asphaltum is applied to to the areas of the copper which are unprotected by the image and are not to be etched. The copper is then subjected to an etching operation such, for example, as with ferric chloride as known in the art. The copper surface is thereby differentially etched inversely to the thickness and hardness of the gelatin which resides on the surface of the copper. There results relief images adapted for use in photogravure printing operations.

Referring now to the accompanying drawing, FIGURE 1 thereof illustrates the combination of layers which go to make up a light sensitive element in accordance with the invention. The gelatin layer under the emulsion may, if desired, contain a yellow Carey Lea silver dispersion or some other antihalation material and it may be plasticized with a gelatin plasticizer such as glycerin or the like.

In the combination shown in the drawing, the film base or support is coated on the emulsion side with the layers in this order:

(10) Film base
(11) Cellulose nitrate stripping layer
(12) A layer composed of unhardened gelatin containing an oil dispersion
(13) The sensitive photographic emulsion layer in which no material which would cause hardening of the gelatin prior to the processing of this layer has been used.

The protective layer in accordance with my invention may contain an antihalation dye or pigment. Some antihalation dyes which may be used in an antihalation amount may include:

(1) Congo red
(2) The product which results with 2-napthylamine-6,8-disulfonic acid is diazotized and coupled with an equimolar amount of chromotopic acid
(3) The product (Schultz No. 208) which results when 1-naphthylamine-4-sulfonic acid is diazotized and coupled with an equimolar amount of 1-naphthol-4-sulfonic acid
(4) Carey Lea silver or manganese dioxide in an amount of about 0.7 to 0.8 gram per square foot, dry weight
(5) Tartrazine.

It will be apparent that various modifications may be made with respect to the silver halide emulsion as well as to the order of the sensitive layers. For instance, the various chemical and spectral sensitizers known in the art may be used as well as coating aids and other emulsion addenda. In the event that a direct positive material is desired, a fogged emulsion layer may be used under the silver halide emulsion as an additional layer such that the unused developer migrates into the fogged layer to form a positive image with respect to the negative image formed in the top layer, after which the top layer can be washed off along the unhardened layers of the fogged emulsion layer.

As another embodiment, a solvent transferring type structure may be used wherein nuclei are deposited in an additional unhardened layer under the silver halide emulsion. A positive image is formed in the nucleating layer by the migration of the tanning developer and comprising silver halide. The top layer and the unhardened areas of the nucleated layer can be removed by washing with warm water.

It will also be appreciated that the so-called dry processes can be used such as that in which a non-aqueous solvent, solid at room temperature, containing the hardening developer is coated over the silver halide emulsion and the emulsion developed by heat after exposure. In a still further embodiment, the non-aqueous solvent can be mixed with the silver halide emulsion as well as with the hardening incorporated developer and heat used to cause development after exposure.

This invention has been described in detail with particular reference to preferred embodiments thereof, but it will be understood that variations and modifications can be effected within the spirit and scope of the invention as described hereinabove and as defined in the appended claims.

I claim:

1. A gravure resist film comprising a dimensionally stable, temporary support containing thereon: (1) a stripping layer, (2) an unhardened colloid layer containing an oil dispersion and (3) a substantially unhardened colloid light sensitive silver halide photographic emulsion, in that order.

2. A gravure resist film comprising a dimensionally stable, temporary support containing thereon: (1) a stripping layer, (2) an unhardened colloid layer containing an oil dispersion and (3) a substantially unhardened gelatin light sensitive silver halide photographic emulsion, in that order.

3. A gravure resist film comprising a dimensionally stable, temporary support containing thereon: (1) a stripping layer, (2) an unhardened gelatin layer containing an oil dispersion and (3) a substantially unhardened gelatin light sensitive silver halide photographic emulsion, in that order.

4. A gravure resist film comprising a dimensionally stable, temporary support containing thereon: (1) a cellulose nitrate stripping layer, (2) an unhardened gelatin layer containing an oil dispersion and (3) a substantially unhardened gelatin light sensitive silver halide photographic emulsion, in that order.

5. A gravure resist film comprising a dimensionally stable, temporary, film support containing thereon: (1) a cellulose nitrate stripping layer, (2) an unhardened gelatin layer containing an oil dispersion and (3) a substantially unhardened gelatin light sensitive silver halide photographic emulsion, in that order.

6. A gravure resist film comprising a polyester film support containing thereon: (1) a stripping layer, (2) an unhardened gelatin layer containing an oil dispersion and (3) a substantially unhardened gelatin light sensitive silver halide photographic emulsion, in that order.

7. A gravure resist film comprising a dimensionally stable, temporary support containing thereon: (1) a stripping layer, (2) an unhardened gelatin layer containing a dispersion of a crystalloidal solvent and (3) a substantially unhardened gelatin light sensitive silver halide photographic emulsion, in that order.

8. A gravure resist film comprising a dimensionally stable, temporary support containing thereon: (1) a stripping layer, (2) an unhardened gelatin layer containing a dispersion of a crystalloidal solvent in an amount of about 200 mg. to 800 mg. per square foot and (3) a substantially unhardened gelatin light sensitive silver halide photographic emulsion, in that order.

9. A gravure resist film comprising a dimensionally stable, temporary support containing thereon: (1) a stripping layer, (2) an unhardened gelatin layer containing an oil dispersion and (3) a substantially unhardened gelatin light sensitive silver halide photographic emulsion containing an incorporated tanning type silver halide developer, in that order.

10. A gravure resist film comprising a dimensionally stable, temporary support containing therein: (1) a stripping layer, (2) an unhardened gelatin layer containing an oil dispersion and (3) a substantially unhardened gelatin light sensitive silver halide photographic emulsion containing a bridged dihydroxynaphthalene incorporated tanning silver halide developer, in that order.

11. A gravure resist film comprising a dimensionally stable, temporary support containing thereon: (1) a stripping layer, (2) an unhardened colloid layer containing an oil dispersion and an antihalation agent and (3) a substantially unhardened collid light sensitive silver halide photographic emulsion, in that order.

12. A gravure resist film comprising a dimensionally stable, temporary support containing thereon: (1) a stripping layer, (2) an unhardened gelatin layer containing an oil dispersion and (3) a substantially unhardened gelatin light sensitive silver halide photographic emulsion containing 3,6-dihydroxybenzonorbornane, in that order.

13. A gravure resist film comprising a polyester, temporary film support containing thereon: (1) a cellulose nitrate stripping layer, (2) an unhardened gelatin layer containing a dispersion of tri-o-cresyl phosphate and (3) a substantially unhardened gelatin light sensitive silver halide photographic emulsion containing an incorporated tanning type silver halide developer, in that order.

14. A gravure resist film comprising a polyester, temporary film support containing thereon: (1) a cellulose nitrate stripping layer, (2) an unhardened gelatin layer containing a dispersion of tri-o-cresyl phosphate and an antihalation agent and (3) a substantially unhardened gelatin light sensitive silver halide photographic emulsion containing 3,6-dihydroxybenzonorbornane, in that order.

15. A process of forming a gravure printing plate comprising developing an exposed light sensitive element comprising a dimensionally stable, temporary support containing thereon: (1) a stripping layer, (2) an unhardened colloid layer containing an oil dispersion and (3) a substantially unhardened colloid light sensitive silver halide photographic emulsion, in that order, in the presence of a tanning type silver halide developer, to obtain a silver image, fixing the emulsion and contacting the said element against a metallic surface, with the emulsion side against the surface, to adhere the emulsion to the surface, stripping the temporary support from the stripping layer, removing the stripping layer, the unhardened colloid layer and the unhardened areas of the emulsion layer and etching.

16. A process of forming a gravure printing plate comprising developing an exposed light sensitive element comprising a dimensionally stable, temporary support containing thereon: (1) a stripping layer, (2) an unhardened colloid layer containing an oil dispersion and (3) a substantially unhardened gelatin light sensitive silver halide photographic emulsion, in that order, in the presence of a tanning type silver halide developer, to obtain a silver image, fixing the emulsion and contacting the said element against a metallic surface, with the emulsion side against the surface, to adhere the emulsion to the surface, stripping the temporary support from the stripping layer, removing the stripping layer, the unhardened colloid layer and the unhardened areas of the emulsion layer and etching.

17. A process of forming a gravure printing plate comprising developing an exposed light sensitive element comprising a dimensionally stable, temporary support containing thereon: (1) a stripping layer, (2) an unhardened gelatin layer containing a crystalloidal solvent dispersion and (3) a substantially unhardened gelatin light sensitive silver halide photographic emulsion containing an incorporated tanning type silver halide developer, in that order, in an alkaline activator, to obtain a silver image, fixing the emulsion and contacting the said element against a metallic surface, with the emulsion side against the surface, to adhere the emulsion to the surface, stripping the temporary support from the stripping layer, removing the stripping layer, the unhardened colloid layer and the unhardened areas of the emulsion layer and etching.

18. A process of forming a gravure printing plate comprising developing an exposed light sensitive element comprising a dimensionally stable, temporary support containing thereon: (1) a stripping layer, (2) an unhardened gelatin layer containing a crystalloidal solvent dispersion and an antihalation agent and (3) a substantially unhardened gelatin light sensitive silver halide photographic emulsion containing an incorporated tanning type silver halide developer, in that order, in an alkaline activator to obtain a silver image, fixing the emulsion and contacting the said element against a metallic surface, with the emulsion side against the surface, to adhere the emulsion to the surface, stripping the temporary support from the stripping layer, removing the stripping layer, the unhardened colloid layer and the unhardened areas of the emulsion layer and etching.

19. A process of forming a gravure printing plate comprising developing an exposed light sensitive element comprising a dimensionally stable, temporary polyester support containing thereon: (1) a cellulose nitrate stripping layer, (2) an unhardened gelatin layer containing a crystalloidal solvent dispersion and (3) a substantially unhardened gelatin light sensitive silver halide photographic emulsion containing an incorporated tanning type silver halide developer, in that order, to obtain a silver image, fixing the emulsion and contacting the said element against a metallic surface, with the emulsion side against the surface, to adhere the emulsion to the surface, stripping the temporary support from the stripping layer, removing the stripping layer, the unhardened colloid layer and the unhardened areas of the emulsion layer and etching.

20. A process of forming a gravure printing plate comprising developing an exposed light sensitive element comprising a dimensionally stable, temporary support containing thereon: (1) a cellulose nitrate stripping layer, (2) an unhardened gelatin layer containing a crystalloidal solvent dispersion and (3) a substantially unhardened gelatin light sensitive silver halide photographic emulsion containing 3,6-dihydroxybenzonorbornane, in that order, in an alkaline activator, to obtain a silver image, fixing the emulsion and contacting the said element against a metallic surface, with the emulsion side against the surface, to adhere the emulsion to the surface, stripping the temporary support from the stripping layer, removing the stripping layer, the unhardened colloid layer and the unhardened areas of the emulsion layer and etching.

References Cited

UNITED STATES PATENTS

| | | | |
|---|---|---|---|
| 2,373,087 | 4/1945 | Alger | 101—401.1 |
| 2,993,790 | 7/1961 | Grumbine | 96—35 |
| 3,057,722 | 10/1962 | Alles | 96—83 |
| 3,291,610 | 12/1966 | Abbott et al. | 96—83 |
| 3,310,403 | 3/1967 | Bryan | 96—28 |

J. TRAVIS BROWN, *Primary Examiner.*

J. R. EVERETT, *Assistant Examiner.*